United States Patent [19]

Tozawa et al.

[11] Patent Number: 5,078,755
[45] Date of Patent: Jan. 7, 1992

[54] METHOD OF REMOVING DISSOLVED GAS FROM LIQUID

[75] Inventors: Osami Tozawa; Takeshi Sasaki; Akira Shimazu; Akio Iwama, all of Osaka, Japan

[73] Assignee: Nitto Denko Corporation, Osaka, Japan

[21] Appl. No.: 639,399

[22] Filed: Jan. 10, 1991

Related U.S. Application Data

[63] Continuation of Ser. No. 396,187, Aug. 21, 1989, abandoned.

[30] Foreign Application Priority Data

| Aug. 20, 1988 | [JP] | Japan | 63-206827 |
| Oct. 19, 1988 | [JP] | Japan | 63-265000 |
| Feb. 7, 1989 | [JP] | Japan | 1-29153 |
| Jun. 26, 1989 | [JP] | Japan | 1-163240 |

[51] Int. Cl.$^5$ .............................................. B01D 19/00
[52] U.S. Cl. .................................... 55/16; 55/159; 55/189
[58] Field of Search ................. 55/16, 158, 159, 189, 55/191

[56] References Cited

U.S. PATENT DOCUMENTS

| 3,751,879 | 8/1973 | Allington | 55/189 X |
| 3,803,810 | 4/1974 | Rosenberg | 55/159 |
| 4,230,463 | 10/1980 | Henis et al. | 55/16 |
| 4,238,207 | 12/1980 | Ruschke | 55/159 |
| 4,325,715 | 4/1982 | Bowman et al. | 55/159 X |
| 4,469,495 | 9/1984 | Hiraizumi et al. | 55/159 X |
| 4,484,935 | 11/1984 | Zampini | 55/158 |
| 4,531,954 | 7/1985 | Klein | 55/159 |
| 4,729,773 | 3/1988 | Shirato et al. | 55/159 X |
| 4,813,983 | 3/1989 | Nohmi et al. | 55/16 X |
| 4,871,378 | 10/1989 | Pinnau | 55/16 |

FOREIGN PATENT DOCUMENTS

| 0271330 | 6/1988 | European Pat. Off. . | |
| 2141570 | 11/1972 | Fed. Rep. of Germany . | |
| 2907188 | 8/1979 | Fed. Rep. of Germany | 55/159 |
| 3029153 | 3/1982 | Fed. Rep. of Germany . | |
| 3204022 | 8/1983 | Fed. Rep. of Germany | 55/159 |
| 2541586 | 8/1984 | France . | |
| 2608067 | 12/1988 | France . | |
| 60-025514 | 2/1985 | Japan . | |
| 63-043609 | 3/1988 | Japan . | |
| 63-111909 | 5/1988 | Japan | 55/158 |
| 63-258605 | 10/1988 | Japan | 55/159 |
| WO87/03276 | 6/1987 | PCT Int'l Appl. | 55/158 |
| 1054995 | 1/1967 | United Kingdom . | |
| 1536681 | 12/1978 | United Kingdom . | |
| 2025256 | 1/1980 | United Kingdom . | |
| 2097281 | 11/1982 | United Kingdom . | |

OTHER PUBLICATIONS

European Search Report No. 89 11 5290.
Journal of Water Pollution Control Federation, vol. 42, part II, No. 8, Aug. 1970, pp. R290–R298.

*Primary Examiner*—Robert Spitzer
*Attorney, Agent, or Firm*—Sughrue, Mion, Zinn Macpeak & Seas

[57] ABSTRACT

This invention relates to a method of removing dissolved gas from liquid, which comprises bringing the liquid containing the gas dissolved therein into contact with a membrane, thereby causing the dissolved gas to selectively permeate the membrane. The membrane is a permselective, composite membrane composed of a porous support and a nonporous, active membrane of a synthetic resin formed on the porous support, or is a permeable membrane having such characteristics that the nitrogen gas permeation rate at 30° C. is in the range from $7 \times 10^{-4}$ to $2 \times 10^2$ Nm$^3$m$^2$·h·atom and that the amount of permeated steam is 100 g/m$^2$·h or less when 20° C. water is supplied to the membrane under atmospheric pressure while maintaining the pressure on its permeate side at 40 mmHg.

12 Claims, 1 Drawing Sheet

METHOD OF REMOVING DISSOLVED GAS FROM LIQUID

This is a continuation of application No. 07/396,187 filed Aug. 21, 1989, now abandoned.

FIELD OF THE INVENTION

This invention relates to a method of removing dissolved gas from liquid. More particularly, it relates to a method of efficiently removing gases dissolved in various types of liquid by the use of membranes.

BACKGROUND

There are many fields in which the liquid being used must be deaerated, such as the operation of analytical equipment (e.g., liquid chromatography, automatic chemical analysis for clinical use, and spectrophotometers for medical use) and various industrial processes (e.g., deionization of water, ultrapure water systems, water for steam boilers, water for nuclear power plants, and water for turbines).

In liquid chromatogrphy, for example, dissolved air, if present in the solvent, will form bubbles in the pump, around the valves and in the detector, causing various troubles. In addition, dissolved oxygen can cause chemical reactions with some of the solutes. In automatic chemical analysis for clinical use, in which the amount of the test sample tends to become smaller in recent years, the measurement accuracy is adversely affected even by a small amount of dissolved oxygen. In the use of a spectrophotometer, absorption is greatly affected by dissolved oxygen and other gases at shorter wavelengths in the ultraviolet region. In the process of deionizing water, on the other hand, oxygen or carbon dioxide dissolved in the liquid shortens the service life of ion-exchange resin. In steam boilers and nuclear power plants, oxygen dissolved in water accelerates the corrosion of vessels and pipes.

Heat boiling, evacuation, ultrasonication and helium methods have hitherto been used for deaeration of liquid. However, each of these methods is not satisfactory in terms of effect and cost; the heat boiling method is highly dangerous because of the high-temperature operations, the evacuation and aultrasonication methods have a low ability to remove dissolved gases, and the helium method suffers from high operation costs.

To put it in more detail, gases dissolved in water to be supplied to steam boilers (particularly dissolved oxygen) can be a primary cause of printing corrosion in boilers and preboilers, and hence must be completely removed prior to use. Two types of methods are known to remove dissolved oxygen in these systems: the methods of mechanically removing oxygen by the use of a deaerator (the heat boiling and evacuation the methods), and methods of chemically reducing dissolved oxygen by the use of a deoxidizing agent, such as hydrazine and sodium sulfite. A high deoxidization efficiency can be achieved only when these two types of methods are used in combination, particularly with the water to be supplied to medium- and high-pressure steam boilers.

Gases dissolved in drinking water and water to be supplied to office buildings particularly dissolved oxygen ) are primarily responsible for the corrosion of feed pipes, which lead to the so-called "reddish water". Reddish water causes sensory problems (e.g., disagreeable taste) and discoloration of washing; hence, some actions are taken when its generation is observed, such as replacement of feed pipes with new ones, renewal of feed pipes by lining, and continuous injection of a rust preventive for feed water. However, any of these actions is not satisfactory in terms of cost, effectiveness or safety, and is accompanied by various restrictions. Under the circumstances, there has been a demand for a simple, effective and low-cost method of preventing such troubles.

The objects of deaeration in ultrapure water systems may be roughly divided into two types: one is to remove dissolved carbon dioxide in order to elongate the service life of anion-exchange resins used in the ion-exchange process, and the other is to remove dissolved oxygen gas from the produced ultrapure water in order to prevent the propagation of microbial cells therein. In the manufacture of semiconductors, the concentration of dissolved oxygen (hereinafter referred to as the OD value) may be a level of 0.5 ppm or lower to achieve the above objects with a memory capacity up to 256 Kbit. Hence, the evacuation method has been used for this purpose.

In recent years, however, semiconductors with a memory capacity of 4 Mbit and 16 Mbit have been developed, for which deaeration is also intended (in addition to the above-mentioned objects) to prevent the formation of an oxide layer on the surface of silicon wafer by dissolved oxygen. To achieve this object, the OD value must be in the range from 0.01 to 0.05 ppm. Furthermore, use of a relatively small size deaerator is required because deaeration must be carried out around the use point. Vacuum deaerators conventionally used are insufficient in deoxidizing ability and are rather large in size.

The water used for the manufacture of beverages (e.g., beer, fruit juices and coffee) should preferably be free of dissolved oxygen and germfree to prevent deterioration and oxidation of the final products.

Such water was formerly produced by the heat boiling method, the evacuation method or the method of bringing carbon dioxide or a mixture thereof with an inert gas into contact with the water being treated.

In the heat boiling method, the water must be heated at temperature of 104° C. or higher in order to reduce the OD value to about 0.1 ppm. The result is a high energy cost, and deposition of scale in various parts of the equipment after long period of operation, which requires much labor to wash it off. The evacuation method is low in deaeration ability, being capable of reducing the OD value only to about 0.2 ppm. In the method of bringing carbon dioxide gas into contact with the water being treated, it is essential to charge the equipment with packings, such as Raschig rings, and to maintain the temperature at about 70° C. in order to reduce the OD value to about 0.1 ppm. Much labor is needed to wash the packings, and the treated water contains dissolved carbon dioxide gas and hence fails to give delicious products when used to brew coffee and like drinks. In the method of using a mixture of carbon dioxide and an inert gas, the water being treated must be heated at a temperature of 101° C. or higher in order to reduce the OD value to about 0.05 ppm, resulting in a high energy cost. Furthermore, delicious coffee and like drinks cannot be obtained in this case too.

As stated above, there are many fields requiring deaeration, and no satisfactory method has yet been established in any of these fields.

A method of deaeration using a tubular membrane made of a synthetic resin, such as silicone resins and polytetrafluoroethylene (Japanese Patent Kokai No.25514/1985, Japanese Utility Model Kokai No.43609/1988, etc.), has been recently proposed.

These resinous membranes, however, are limited in mechanical strengths and moldability, and also have the problem that membranes of larger thickness must be used in cases of lower deaeration rates.

SUMMARY OF THE INVENTION

Intensive studies to solve the above-described problems involved in the removal of gases dissolved in liquid have led us to find that dissolved gases can be efficiently removed by treating the liquid with a permselective, composite membrane or a permeable membrane having specific characteristics. This invention was accomplished on the basis of these findings.

This invention provides a method of removing gas dissolved in liquid, which comprises bringing the liquid containing dissolved gas into contact with a permselective, composite membrane comprising a porous support and a nonporous, active membrane made of a synthetic resin formed on said support layer, thereby causing the dissolved gas to selectively permeate said membrane.

This invention also provides a method of removing gas dissolved in liquid, which comprises bringing said liquid containing dissolved gas into contact with a permeable membrane having the characteristics that the nitrogen gas permeation rate at 30° C. is in the range from $7 \times 10^{-4}$ to $2 \times 10^2$ $Nm^3/m^2 \cdot h \cdot atm$ and that, when 20° C. water is supplied under atmospheric pressure to said membrane while maintaining the pressure on its permeate side at 40 mmHg, the amount of steam coming out through the membrane is 100 $g/m^2 \cdot h$ or less.

BRIEF DESCRIPTION OF THE DRAWING

The accompanying figure shows a graph illustrating the results of deaeration tests carried out in the Examples and Comparative Examples.

DETAILED DESCRIPTION OF THE INVENTION

Figure 1:
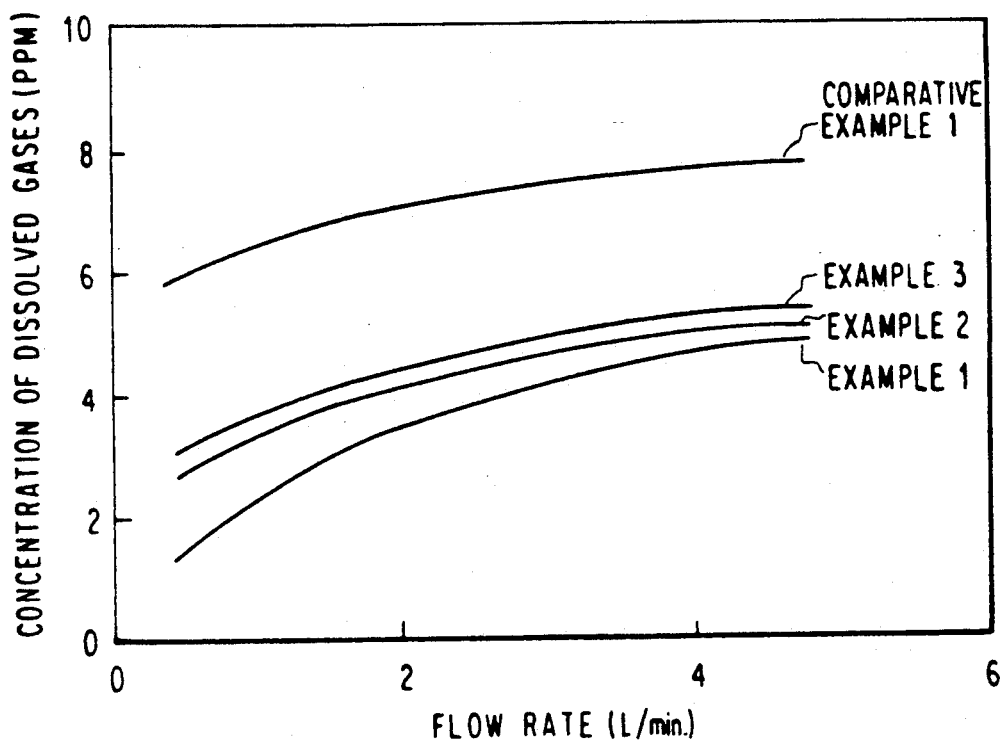

There is no specific limitation upon the type of liquid to which the method of this invention is applicable. As typical examples there may be mentioned the liquids used in analytical equipment (e.g., liquid chromatography, automatic chemical analysis for clinical use, and spectrophotometers for medical use) and in various industrial processes (e.g., deionization of water, ultrapure water systems for the manufacture of semiconductors, and steam boilers in power plants, ships, nuclear power plants, turbines and general industries).

These liquids include river water, well water, tap water, industrial water and normal water specified by the pharmacopeia, which generally contain cations (e.g., Ca, Mg, Na and K ions ), anions (e.g., chloride, sulfate and bicarbonate ions) and organic substances formed by putrefaction of living bodies. Also included are liquid containing water-insoluble substances (e.g., colloidal and suspended particles).

The method of this invention may also be applied to the water flowing in supply pipes for general houses and office buildings, in cooling towers and in circulation piping; and to the water used in the manufacture of soy sauce, beer, sake, fruit juices, coffee and other beverages.

Dissolved gases herein mean oxygen, carbon dioxide, nitrogen, chlorine, ammonia and other gases.

The permselective, composite membrane used in the method of this invention comprises a porous support and a nonporous, active layer formed on said support layer, in which said support layer preferably has an anisotropic structure composed of a dense skin layer and a porous layer supporting the same, and said nonporous, active layer made of a synthetic resin is formed on said dense layer. Activity herein means the ability to separate dissolved gases from liquid.

The molecular cutoff of said porous support should preferably be in the range from 5,000 to 500,000. If it is less than 5,000, the deaeration rate of final product is not sufficiently high. If it exceeds 500,000 on the other hand, the synthetic resin can permeate the porous support during the step of forming a nonporous, active membrane as described later, producing a dense resinous layer inside the support layer and thereby reducing the deaeration rate of the total membrane.

The molecular cutoff can be determined by measuring the rejection of said porous support for a solute of known molecular weight. In this invention, aqueous solutions of monodisperse polyethylene glycol of 5,000 ppm concentration are supplied to a membrane at 25° C. under a pressure of 4 $Kg/cm^2$, and the molecular weight of polyethylene glycol whose rejection is at least 90% is defined as the molecular cutoff of that membrane. Such anisotropic membranes having specific cutoff values are generally called ultrafiltration membranes in liquid-liquid separation, and hence are referred to as ultrafiltration membranes in some cases also in this specification.

The pure water permeation rate of the above-mentioned porous support should preferably be in the range from 300 to 800 $l/m^2 \cdot h \cdot atm$.

There is no specific limitation upon the type of material for such porous supports as described above, so long as the molecular cutoff is as specified above. Illustrative exmples include aromatic polysulfones, aromatic polyimides and aromatic polyamides. Of these, aromatic polysulfones are the most preferred because of their high resistance to chlorine, pH and heat in aqueous systems—for example, those having a recurring unit represented by the following general formula (I) or (II):

$$-A-SO_2-A-O-(A-R_m-A-X)_n- \quad (I)$$

$$-A-SO_2-A-SO_2-A-O- \quad (II)$$

(wherein A denotes the same or a different aromatic radical; R is a bivalent organic radical; X is O or $SO_2$; and m and n are each 0 or 1 ).

For instance, aromatic polysulfones having any one of the following recurring units are advantageously used in the method of this invention:

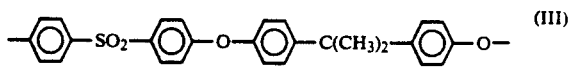

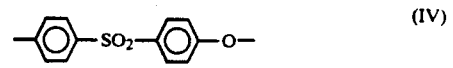

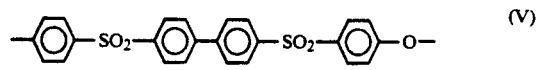

In order for the permselective, composite membrane of this invention to have practical levels of permeability and mechanical strengths, the above-mentioned aromatic polysulfone should be the one whose solution in dimethylformamide (1.0 g/100 ml) shows a reduced viscosity ($\eta sp/C$) at 25° C. in the range from 0.2 to 1.0, preferably from 0.25 to 0.80. A polymer of lower reduced viscosity is poor in membrane-forming ability, while a polymer of too high a reduced viscosity is sparingly soluble in solvents and hence is low in membrane forming efficiency.

There is no specific limitation upon the shape of porous support, but a hollow-fiber form is desirable for the purpose of this invention, in which the outer diameter should preferably be in the range from 500 to 4000, $\mu$m and the inner diameter should preferably be in the range from 200 to 3000, $\mu$m.

In the method of this invention, the porous support may be formed on a reinforcing material such as a nonwoven fabric.

When deaerating a liquid by the use of a permselective, composite membrane, it is preferable that the active membrane be not wettable with the liquid, orthewise the liquid molecules permeate the membrane more rapidly, resulting in a reduced deaeration rate.

Hence, a water-repellent resin is preferably used as the material of active membrane provided on the dense layer of the above-mentioned porous support.

To be more specific, a synthetic resin showing a critical surface tension of 17 to 35 dyne/cm, preferably 18 to 30 dyne/cm, when measured in the form of film is advantageously used for this purpose. If the surface tension is outside the above range, the liquid permeates the active membrane more rapidly, leading to a drop in the deaeration rate.

The critical surface tension means the surface tension of a liquid showing zero contact angle against the film surface.

To ensure efficient deaeration, it is preferable to use a synthetic resin with a high gas permeability, which shows an oxygen gas permeability coefficient ($cm^3$(STP)·cm/$cm^2$·sec·cmHg) at 30° C. of $10 \times 10^{-10}$ or higher, preferably $30 \times 10^{-10}$ or higher. If the oxygen gas permeability coefficient is outside the above range, the permeation rate of dissolved gas, namely the deaeration rate, tends to be lower.

The oxygen gas permeability coefficient is obtained by measuring the oxygen gas permeation rate through a film of known thickness ($cm^3$(STP)m/$cm^2$·sec·cmHg) and multiplying the measured value by the film thickness.

As examples of such synthetic resins, there may be mentioned silicone resins, poly(4-methylpentene-1), polypropylene and polyethylene.

The nonporous, active membrane made of such a synthetic resin as described above has a thickness of 0.01 to 10, $\mu$m, preferably 0.01 to 5 $\mu$m.

The permselective, composite membrane used in the method of this invention can be obtained by bringing a solution of synthetic resin in an organic solvent into contact with a porous support, evaporating the solvent, and drying the applied layer at room temperature or by heating as required, thereby forming a nonporous, active membrane made of the synthetic resin on the surface of porous support.

In the above process, if the applied resin permeates the support layer, a nonporous, dense layer of resin is formed also inside the support, resulting in an increased thickness of the dense layer. It is therefore preferable to use a synthetic resin having an average molecular weight equal to or higher than the molecular cutoff of the porous support. Normally, a synthetic resin having a number-average molecular weight of 10,000 to 300,000 should preferably be selected.

The number-average molecular weight can be measured by the GPC method.

There is no specific limitation upon the type of organic solvent used to prepare the resin solution, and a suitable one may be selected according to the type of resin employed. Typical examples include aliphatic hydrocarbons such as hexane, heptane, octane, isobutane, isopentane and isooctane, and alcohols such as methanol, ethanol, propanol and isopropanol.

A relatively dilute resinous solution in such an organic solvent is brought into contact with a porous support, preferably with the surface of dense layer on a porous support of the anisotropic structure. In actual practice, this contact is effected by coating the resinous solution on the surface of the dense layer or by soaking the surface of the dense layer in the resinous solution. The solvent is then evaporated at room temperature or by heating as required at a temperature of about 90° C., forming a nonporous, active membrane made of a synthetic resin.

The active membrane thus formed should be as thin as practicable. The Deaeration rate of the final composite membrane is determined substantially by the thickness of this active membrane; the thinner the active membrane, the higher the deaeration rate.

For this reason, the resinous solution to be applied should be relatively dilute; the resin concentration should be in the range from 0.01 to 15 weight %, preferably from 0.1 to 10 weight %. If the concentration is lower than 0.01 weight %, the formed membrane tends to have defects, such as pinholes. If the concentration is higher than 15 weight %, on the other hand, the formed membrane is too thick, resulting in a practically low deaeration rate.

The nonporous, active membrane made of a synthetic resin thus formed on the surface of the porous support has a thickness of 0.01 to 10 $\mu$m, preferably 0.01 to 5, $\mu$m, because too thin a membrane tends to have membrane defects, while too thick a membrane results in a practically low deaeration rate.

In this invention, the active membrane prepared above may further be crosslinked by irradiation to form a three-dimensional structure. Any type of ionizing radiation may be used for this purpose, for example, electron rays, $\alpha$-rays, $\beta$-rays, $\gamma$-rays and ultraviolet rays. The suitable dose may vary with the temperature, pressure and other atmospheric conditions, but is normally in the range from 1 to 50 Mrad, preferably 3 to 20 Mrad. Such irradiation forms free radicals on the side chains of the synthetic resin, which unite together to increase the crosslink density, thereby enhancing the mechanical strengths and selective permeability. Crosslinking may also be effected in the presence of a radical polymerization initiator, such as benzoin ethers (e.g., isopropyl benzoin ether and isobutyl benzoin ether), benzophenone derivatives (e.g., benzophenone and o-benzoylmethyl benzoate), xanthone derivatives (e.g., xanthone, thioxanthone, 2-chlorothioxanthone and 2-alkylthioxanthones), acetophenone derivatives (e.g., acetophenone, trichloroacetophennone, 2,2-diethoxyacetophenone and benzyldimethylketol), and 2-ethylanthraquinone.

There is no specific limitation upon the structure of the other types of permeable membranes used in the method of this invention, insofar as those have specific membrane characteristics as described below. Typical examples include homogeneous membranes comprising a nonporous, active membrane; asymmetric membranes consisting of a dense layer (or an active dense layer) and a porous layer supporting the same; and composite membranes prepared by providing a nonporous, active membrane on an asymmetric membrane (in which, preferably, part of the nonporous, active membrane is formed inside the dense layer). The term activity herein means the ability of separating dissolved gas from liquid.

One of the above-mentioned membrane characteristics is nitrogen gas permeation rate at 30° C., which should be in the range from $7 \times 10^{-4}$ to $2 \times 10^2$, preferably from $3 \times 10^{-3}$ to $5 \times 10^0$ $Nm^3/m^2 \cdot h \cdot atm$. If the rate is lower than $7 \times 10^{-4}$ $Nm^3/m^2 \cdot h \cdot atm$, the permeation rate of dissolved gas (namely deaeration rate) will be too low. If the rate is higher than $2 \times 10^2$ $Nm^3/m^2 \cdot h \cdot atm$, on the other hand, the permeation rate of liquid molecules will increase, resulting in a drop in deaeration efficiency.

Another membrane characteristic required is that, when 20° C. water is supplied to a permeable membrane under atmospheric pressure while maintaining the pressure on the permeate side at 40 mmHg, the amount of permeated steam should be 100 $g/m^2 \cdot h$ or less, preferably 30 $g/m^2 \cdot h$ or less. If this amount is larger than 100 $g/m^2 \cdot h$, the pressure on the permeate side will increase by this steam pressure, leading to a drop in the deaeration rate. As a result, a large steam-concentration equipment has to be provided on the permeat side.

The homogeneous membranes and nonporous, active membranes used in the method of this invention should have a nitrogen gas permeability coefficient of at least $1 \times 10^{-10}$ $Nm^3 \cdot m/m^2 \cdot h \cdot atm$, preferably at least $1 \times 10^{-9}$ $Nm^3 \cdot m/m^2 \cdot h \cdot atm$. When the coefficient is less than $1 \times 10^{-10}$ $Nm^3 \cdot m/m^2 \cdot h \cdot atm$, final products of sufficiently high deaeration rate might not be obtained by the present level of film-forming technology. As illustrative examples of the homogeneous membrane and nonporous, active membrane there may be mentioned silicone resins, poly(4-methylpentene-1), natural rubber, poly(2,6-dimethylphenylene oxide), Teflon, neoprene, polyethylene polystyrene and polypropylene.

As examples of the asymmetric membranes used in the method of this invention, there may be mentioned aromatic polysulfones, aromatic polyamides and aromatic polyimides. Of these, aromatic polysulfones are preferably used because of the high resistance to chlorine, pH and heat in aqueous systems.

There is no specific limitation upon the shape of the above permeable membranes, but a hollow-fiber form or a flat form is desirable for the purpose of this invention. It may also be formed on a reinforcing material such as a nonwoven fabric.

The homogeneous membranes used in the method of this invention may be prepared by any known methods, for example, by extrusion, compression molding and injection molding. The same is true of the composite membrane used in the method of this invention.

There is no specific limitation upon the shape of the above-described permselective, composite membranes, permeable membranes with specific characteristics, and modules comprising the same, but the so-called hollow fiber modules comprising a bundle of hollow-fiber type membranes are preferably used. In addition, the so-called spiral wound modules comprising rolled sheet-like membranes and modules of other structures may also be used.

In the deaeration method of this invention, a liquid containing dissolved gas is brought into contact with a permselective, composite membrane or a specific permeable membrane to cause selective permeation of the dissolved gas through the membrane, thereby leaving a liquid of reduced dissolved gas concentration on the feed side. In this process, it is preferable that the permeate side be maintained under reduced pressure; the lower the pressure, the lower will be the dissolved-gas concentration of liquid left on the feed side. The pressure should be in the range from 0 to 200 mmHg, preferably from 20 to 150 mmHg.

The advantages of the method of this invention over the conventional method using a synthetic resin tube are that deaeration rate can be increased while suppressing permeation of steam and vapor of other liquids, and that equipment, running and maintenance costs are lower.

Another advantage is higher safety assured when applied to drinking water and supply water to office buildings because no chemical agent is used.

Furthermore, the heating operation and the contact operation with carbon dioxide or an inert gas can be eliminated when treating water to be used for the manufacture of beverages.

According to the method of this invention, treatment of liquid containing about 5 to 14 ppm dissolved gas (for example, water to be supplied to steam boilers and of office buildings, drinking water, ultrapure water, and water to be used for the manufacture of beverages) efficiently gives product liquid containing about 0.01 to 3 ppm dissolved gas (about 0.01 to 0.05 ppm dissolved gas in the case of ultrapure water) at lower costs.

EXAMPLES

The invention is illustrated but not limited by the following examples in which the parts are expressed on a weight basis.

EXAMPLE 1

A solution of 15 parts of an aromatic polysulfone composed of the recurring units (III) described earlier ("Polysulfone P-1700" of Union Carbide Corp.) and 5 parts of a polyethylene glycol having an average molecular weight of 600 in 80 parts N-methyl-2-pyrrolidone was extruded through a circular nozzle into a form of hollow fiber, which was coagulated from its inner and outer surfaces by using water as coagulant, giving a hollow-fiber type, porous membrane having an inner diameter of 1.1 mm and an outer diameter of 1.9 mm.

Observation of its cross-section under a scanning electron microscope revealed that this is an anisotropic membrane which is composed of a dense layer on the surface and a rough, porous structure inside, and which contains empty spaces from place to place (the so-called digitiform structure). Its molecular cutoff was 100,000 and its pure water permeation rate was 600 $l/m^2 \cdot h \cdot atm$.

This hollow-fiber type, porous membrane was dried at 30° C. and used as porous support.

Separately, a solution of 10 parts prepolymer of cross-linkable polydimethylsiloxane containing vinyl radicals as reactive groups and 1 part crosslinking agent in 90 parts isooctane was heated at 70° C. for seven hours, and the silicone resin solution thus obtained was diluted with isooctane to a resin concentration of 1.8%. This solution of a crosslinkable silicone resin was coated on the surface of inner dense layer of the porous support prepared above to a uniform thickness of 50 μm by the air-doctor coating method. Isooctane was evaporated by heating at 120° C., and the dried product was allowed to stand at room temperature for 24 hours, giving a permselective, composite membrane comprising an active membrane made of a crosslinked silicone resin about 1 μm thick provided on the dense layer of porous support.

The critical surface tension of the crosslinked silicone resin was 24 dyne/cm and its oxygen gas permeability coefficient at 30° C. was $5.90 \times 10^{-8}$ cm$^3$(STP)·cm/cm$^2$·sec·cmHg.

Table 1 shows the specifications for a module prepared by using the thus obtained membranes (200 hollow-fiber type membranes 80 cm long and 1.1 mm in inner diameter).

Distilled water saturated with air under atmospheric pressure (concentration of dissolved oxygen gas at 25° C.: 8.11 ppm) was run on the feed side of this module (through the inside of hollow-fiber type membranes) while maintaining the pressure on the permeate side (the outside of hollow-fiber type membranes) at 40 mmHg.

The result of the deaeration test thus obtained (relation between the flow rate of feed water and the concentration of dissolved oxygen gas in product water) is shown in the accompanying figure.

EXAMPLE 2

An experiment was carried out in much the same manner as in Example 1 except that the thickness of crosslinked silicone resin used as the active membrane was 10 μm. The result is also shown in the same figure.

EXAMPLE 3

The hollow-fiber type, ultrafiltration membrane of aromatic polysulfone obtained in Example 1 was immersed in 30% aqueous solution of glycerol at room temperature for 24 hours and dried in a dryer held at 30° C.

Separately, 1 part of poly(4-methylpentene-1) having an average molecular weight of 70,000 was dissolved in 100 parts of cyclohexane, giving a resinous solution of 1.0 weight % concentration. This solution was coated at room temperature on the surface of inner dense layer of the porous support prepared above to a uniform thickness of 50 μm by the air-doctor coating method. Cyclohexane was evaporated at room temperature from the coated film, giving a permselective, composite membrane comprising an active membrane made of poly(4-methylpentene-1) about 0.7 μm thick provided on the dense layer of aromatic polysulfone membrane. The critical surface tension of the poly(4-methylpentene-1) resin was 29 dyne/cm and its oxygen gas permeability coefficient at 30° C. was $3.23 \times 10^{-9}$ cm$^3$(STP)·cm/cm$^2$·sec·cmHg.

The permselective, composite membrane obtained above was used to prepare a module in the same manner as in Example 1, which was subjected to a permeability test in the same way. The result is shown in the same figure as above.

COMPARATIVE EXAMPLE 1

Poly(4-methylpentene-1) used in Example 3 was extruded into a form of hollow fiber, giving a hollow-fiber type, homogeneous membrane 1.1 mm in inner diameter, 1.5 mm in outer diameter and 200 μm in thickness.

This homogeneous membrane was used to prepare a module in the same manner as in Example 1, which was subjected to a permeability test in the same way. The result is shown in the same figure as above.

As can be seen from the figure, the concentration of dissolved gas can be reduced more extensively by the method of this invention, compared with the case of this Comparative Example.

EXAMPLE 4

A solution of 15 parts of an aromatic polysulfone ("Polysulfone P-1700" of Union Carbide Corp.) and 5 parts of a polyethylene glycol having an average molecular weight of 600 in 80 parts N-methyl-2-pyrrolidone was extruded through a circular nozzle into a form of hollow fiber, which was coagulated from its inner and outer surfaces by using water as coagulant, giving a hollow-fiber type, porous membrane having an inner diameter of 0.55 mm and an outer diameter of 1.00 mm.

Observation of its cross-section under a scanning electron microscope revealed that this is an anisotropic membrane which is composed of a dense layer on the surface and a rough, porous structure inside, and which contains empty spaces from place to place (the so-called digitiform structure). It was dried at 100° C., and the dried membrane was used as porous support. Its nitrogen gas permeation rate at 25° C. was 15 Nm$^3$/m$^2$·h·atm.

Separately, a solution of 10 parts prepolymer of crosslinkable polydimethylsiloxane containing vinyl radicals as reactive groups and 1 part crosslinking agent in 90 parts isooctane was heated at 70° C. for seven hours, and the silicone resin solution thus obtained was diluted with isooctane to a resin concentration of 2.0%. This solution of a crosslinkable silicone resin was uniformly coated on the surface of inner dense layer of the porous support prepared above by the air-doctor coating method. Isooctane was evaporated by heating at 80° C., and the dried product was allowed to stand at room temperature for 24 hours, giving a permselective, composite membrane comprising an active membrane made of a crosslinked silicone resin provided on the dense layer of porous support. Its nitrogen gas permeation rate at 25° C. was 0.033 Nm$^3$/m$^2$·atm.

A hollow fiber module was prepared by rolling up the thus obtained membranes (3600 hollow fiber membranes 100 cm long and 0.55 mm in inner diameter).

Distilled water saturated with air under atmospheric pressure (concentration of dissolved oxygen gas at 20° C.: 8.84 ppm) was run on the feed side of this module (through the inside of hollow fiber membranes) at a rate of 1 l/min while maintaining the pressure on the permeate side (the outside of hollow fiber membranes) at 40 mmHg.

The result of deaeration test thus obtained (the concentration of oxygen gas dissolved in product water, and the amount of permeated steam) is shown in Table 2.

EXAMPLE 5

An experiment was carried out in much the same manner as in Example 4 except that a hollow fiber module was prepared by rolling up the dried, hollow-fiber type porous membranes The result is also shown in Table 2.

EXAMPLE 6

A module was prepared by using 200 homogeneous silicone tubes 80 cm long (product of Shinetsu Silicone Co., Ltd.) with an inner diameter of 1 mm, an outer diameter of 2 mm, a thickness of 500 μm and a nitrogen gas permeation rate at 25° C. of 0.0015 Nm$^3$/m$^2$·h·atm.

Distilled water saturated with air under atmospheric pressure (concentration of dissolved oxygen gas at 20° C.: 8.84 ppm) was run through this module at a rate of 50 ml/min while maintaining the pressure on the permeate side (the outside of hollow fiber membranes) at 40 mmHg.

The result obtained is shown in Table 2.

COMPARATIVE EXAMPLE 2

A hollow-fiber, porous membrane with an inner diameter of 0.5 mm, an outer diameter of 1.00 mm and a nitrogen gas permeation rate at 25° C. of 300 Nm$^3$/m2·h·atm was prepared in much the same manner as in Example 4, except that 10 parts of aromatic polysulfone and 85 parts of N-methyl-2-pyrrolidone were used.

A deaeration test was carried out in much the same way as in Example 4 except that the hollow-fiber porous membrane obtained above was used as element of the module. The result is also shown in Table 2.

EXAMPLE 7

Boiler water of 20° C. saturated with air under atmospheric pressure (concentration of dissolved oxygen gas: 8.84 ppm) was run on the feed side of the module prepared in Example 4 (through the inside of hollow fiber membranes) at a rate of 1 l/min while maintaining the pressure on the permeate side (the outside of hollow fiber membranes) at 40 mmHg. The result of deaeration thus obtained is shown in Table 2.

EXAMPLE 8

A deaeration test was conducted in much the same manner as in Example 7 except that the temperature of boiler water to be fed was 60° C. (concentration of dissolved oxygen gas: 4.26 ppm). The result is also shown in Table 2.

EXAMPLE 9

Tap water of 20° C. saturated with air under atmospheric pressure (tap water of Kusatsu City; concentration of dissolved oxygen: 8.84ppm) was run on the feed side of the module obtained in Example 4 at a rate of 1 l/min while maintaining the pressure on the permeate side (the outside of hollow fiber membranes) at 40 mmHg. The result of deaeration test is shown in Table 2.

EXAMPLE 10

A deaeration test was carried out in much the same way as in Example 9 except that the tap water was run at a rate of 3 l/min. The result is also shown in Table 2.

EXAMPLE 11

A porous support was prepared in much the same way as in Example 4 except that the hollow-fiber, porous membrane was dried at 160° C. The nitrogen gas permeation rate of this porous support at 25° C. was 10 Nm$^3$/m$^2$·h·atm.

It was then used to prepare a composite membrane in the same way as in Example 4, which showed a nitrogen gas permeation rate of 0.007 Nm$^3$/m$^2$·h·atm at 25° C.

A hollow fiber module was prepared by laminating the thus obtained membranes (3600 hollow fiber membranes 100 cm long and 0.55 mm in inner diameter).

Two such modules were connected together, and ultrapure water of 20° C. saturated with air under atmospheric pressure (concentration of dissolved oxygen gas: 8.84 ppm) was run on the feed side at a rate of 1.2 l/min while maintaining the pressure on the permeate side (the outside of hollow fiber membranes) at 40 mmHg. The result of deaeration test is shown in Table 2.

EXAMPLE 12

A hollow-fiber, porous membrane 0.3 mm in inner diameter and 0.45 mm in outer diameter was obtained in the same way as in Example 4, which was dried at 170° C. and used as porous support. Its nitrogen gas permeation rate at 25° C. was 5 Nm$^3$/m$^2$·h·atm.

It was used to make a composite membrane in the same way as in Example 4, which showed a nitrogen gas permeation rate of 0.013 Nm$^3$/m$^2$·h·atm at 25° C.

A hollow fiber module was prepared by rolling up the thus obtained membranes (16,000 hollow fiber membranes 100 cm long and 0.3 mm in inner diameter).

Ultrapure water of 20° C. saturated with air under atmospheric pressure (concentration of dissolved oxygen gas: 8.84 ppm) was run on the feed side at a rate of 2.6 l/min while maintaining the pressure on the permeate side (the outside of hollow fiber membranes) at 40 mmHg. The result of deaeration test is shown in Table 2.

EXAMPLE 13

A hollow-fiber, porous membrane with an inner diameter of 0.3 mm, an outer diameter of 0.45 mm and a nitrogen gas permeation rate at 25° C. of 60 Nm$^3$/m$^2$·h·atm was prepared in much the same manner as in Example 12, except that 12 parts of aromatic polysulfone, 5 parts of polyethylene glycol with an average molecular weight of 600 and 83 parts of N-methyl-2-pyrrolidone were used, and drying was carried out at 100° C. A deaeration test was carried out in much the same way as in Example 12 except that the hollow-fiber porous membrane obtained above was used as element of the module. The result is shown in Table 2.

EXAMPLE 14

A hollow-fiber, porous membrane 0.3 mm in inner diameter and 0.45 mm in outer diameter was obtained in the same way as in Example 12, which was dried at 160° C. and used as porous support. Its nitrogen gas permeation rate at 25° C. was 10 Nm$^3$/m$^2$·h·atm.

It was used to make a composite membrane in the same way as in Example 12, which showed a nitrogen gas permeation rate of 0.007 Nm$^3$/m$^2$·h·atm at 25° C.

A hollow fiber module was prepared by rolling up the thus obtained membranes (20,000 hollow fiber membranes 100 cm long and 0.3 mm in inner diameter).

Two such modules were connnected together, and water to be used for the manufacture of beverages saturated with air under atmospheric pressure (concentration of dissolved oxygen gas at 20° C.: 8.84 ppm) was run on the feed side at a rate of 5.2 l/min while maintaining the pressure on the permeate side (the outside of hollow fiber membranes) at 40 mmHg. The result of deaeration test (the concentration of oxygen gas dissolved in product water, the amount of permeated steam, and the presence or absence of scale) is shown in Table 3.

EXAMPLE 15

A hollow-fiber, porous membrane with an inner diameter of 0.3 mm, an outer diameter of 0.45 mm and a nitrogen gas permeation rate at 25° C. of 100 $Nm^3/m^2 \cdot h \cdot atm$ was prepared in much the same manner as in Example 14, except that 12 parts of aromatic polysulfone and 83 parts of N-methyl-2-pyrrolidone were used and drying was carried out at 100° C. A deaeration test was carried out in much the same way as in Example 14 except that the hollow-fiber porous membrane obtained above was used as element of the module. The result is shown in Table 3.

TABLE 1

| | Material of Active Membrane | Thickness of Active Membrane | Porous Support | Type of Membrane |
| --- | --- | --- | --- | --- |
| Example 1 | Silicone | 1 μm | provided | Composite membrane |
| Example 2 | Silicone | 10 | provided | Composite membrane |
| Example 3 | Poly(4-methyl-pentene-1) | 0.7 | provided | Composite membrane |
| Comp. Ex. 1 | Poly(4-methyl-pentene-1) | 200 | not provided | Homogeneous membrane |

TABLE 2

| | Membrane | Nitrogen Gas Permeation Rate ($Nm^3/m^2 \cdot h \cdot atm$) | Amount of Permeated Steam ($g/m^2 \cdot h$) | Concentration of Dissolved Oxygen Gas (ppm) |
| --- | --- | --- | --- | --- |
| Example 4 | Silicone/polysulfone composite membrane | 0.033 | 0.28 | 0.5 |
| Example 5 | Polysulfone porous membrane | 15 | 0.32 | 0.5 |
| Example 6 | Silicone homogeneous membrane | 0.0015 | 0.25 | 0.8 |
| Comp. Ex. 2 | Polysulfone porous membrane | 300 | 150 | 0.5 |
| Example 7 | Silicone/polysulfone composite membrane | 0.033 | 0.27 | 0.35 |
| Example 8 | Silicone/polysulfone composite membrane | 0.033 | 87.6 | 0.36 |
| Example 9 | Silicone/polysulfone composite membrane | 0.033 | 0.27 | 0.35 |
| Example 10 | Silicone/polysulfone composite membrane | 0.033 | 0.29 | 1.70 |
| Example 11 | Silicone/polysulfone composite membrane | 0.007 | 0.25 | 0.03 |
| Example 12 | Silicone/polysulfone composite membrane | 0.013 | 0.30 | 0.02 |
| Example 13 | Polysulfone porous membrane | 60 | 0.55 | 0.03 |

TABLE 3

| | Membrane | Nitrogen Gas Permeation Rate ($Nm^3/m^2 \cdot h \cdot atm$) | Amount of Permeated Steam ($g/m^2 \cdot h$) | Concentration of Dissolved Oxygen Gas (ppm) | Scale |
| --- | --- | --- | --- | --- | --- |
| Example 14 | Silicone/polysulfone composite membrane | 0.007 | 0.25 | 0.03 | None |
| Example 15 | Polysulfone porous membrane | 100 | 0.40 | 0.03 | None |

(Temperature of treated water: 20° C.)

What is claimed is:

1. A method of removing dissolved gas from liquid, which comprises bringing said liquid containing the gas dissolved therein into contact with a permselective, composite membrane composed of a porous support and a nonporous, active membrane of a synthetic resin formed on said porous support, thereby causing the dissolved gas to selectively permeate said composite membrane, wherein said porous support has a molecular cutoff in the range of 5,000 to 500,000, and wherein said nonporous, active membrane possesses at 30° C. a nitrogen gas permeation rate in the range of $7 \times 10^{-4}$ to $2 \times 10^2 Nm^3/m^2 \cdot h \cdot atm$, and a stream permeation rate of 100 $g/m^2 \cdot h$ or less when 20° C. water is supplied to said nonporous, active membrane under atmospheric pressure on its permeate side at 40 mmHg.

2. The method of removing dissolved gas from liquid as defined in claim 1, wherein said porous support is an anisotropic membrane comprising a dense skin layer and a support layer that holds said dense skin layer, and said nonporous, active membrane of a synthetic resin is provided on the surface of said dense skin layer.

3. The method of removing dissolved gas from liquid as defined in claim 1, wherein said synthetic resin shows, when measured in the form of film, a critical surface tension of 17 to 35 dyne/cm and an oxygen gas permeation rate of at least $10 \times 10^{-10}$ $cm^3$ (STP)·cm/$cm^2$·sec·cmHg at 30° C.

4. The method of removing dissolved gas from liquid as defined in claim 1, wherein the thickness of said nonporous, active membrane of synthetic resin is in the range from 0.01 to 10 μm.

5. The method of removing dissolved gas from liquid as defined in claim 1, wherein said porous support is made of an aromatic polysulfone.

6. The method of removing dissolved gas from liquid as defined in claim 1, wherein said permselective, composite membrane is a hollow fiber membrane or a flat membrane.

7. The method of removing dissolved gas from liquid as defined in claim 1, wherein said liquid containing the gas dissolved therein is water to be supplied to steam boilers.

8. The method of removing dissolved gas from liquid as defined in claim 1, wherein said liquid containing the gas dissolved therein is drinking water or water to be supplied to office buildings.

9. The method of removing dissolved gas from liquid as defined in claim 1, wherein said liquid containing the gas dissolved therein is ultrapure water.

10. The method of removing dissolved gas from liquid as defined in claim 1, wherein said liquid containing the gas dissolved therein is water to be used for the manufacture of beverages.

11. The method of removing dissolved gas from liquid as defined in claim 1, wherein said nonporous, active membrane possesses at 30° C. a nitrogen gas permeation rate in the range of $3 \times 10^{-3}$ to $5 \times 10^0$ Nm$^3$/m$^2$·hr·atm.

12. The method of removing dissolved gas from liquid as defined in claim 1, wherein said nonporous, active membrane possesses a steam permeation rate of 30 g/m$^2$·h or less when 20° C. water is supplied to said nonporous, active membrane under atmospheric pressure on its permeate side at 40 mmHg.

* * * * *